Feb. 5, 1946.   D. L. WEST   2,394,129
PHOTOELECTRIC CONSISTENCY INDICATING METHOD
Filed June 23, 1941   3 Sheets-Sheet 1
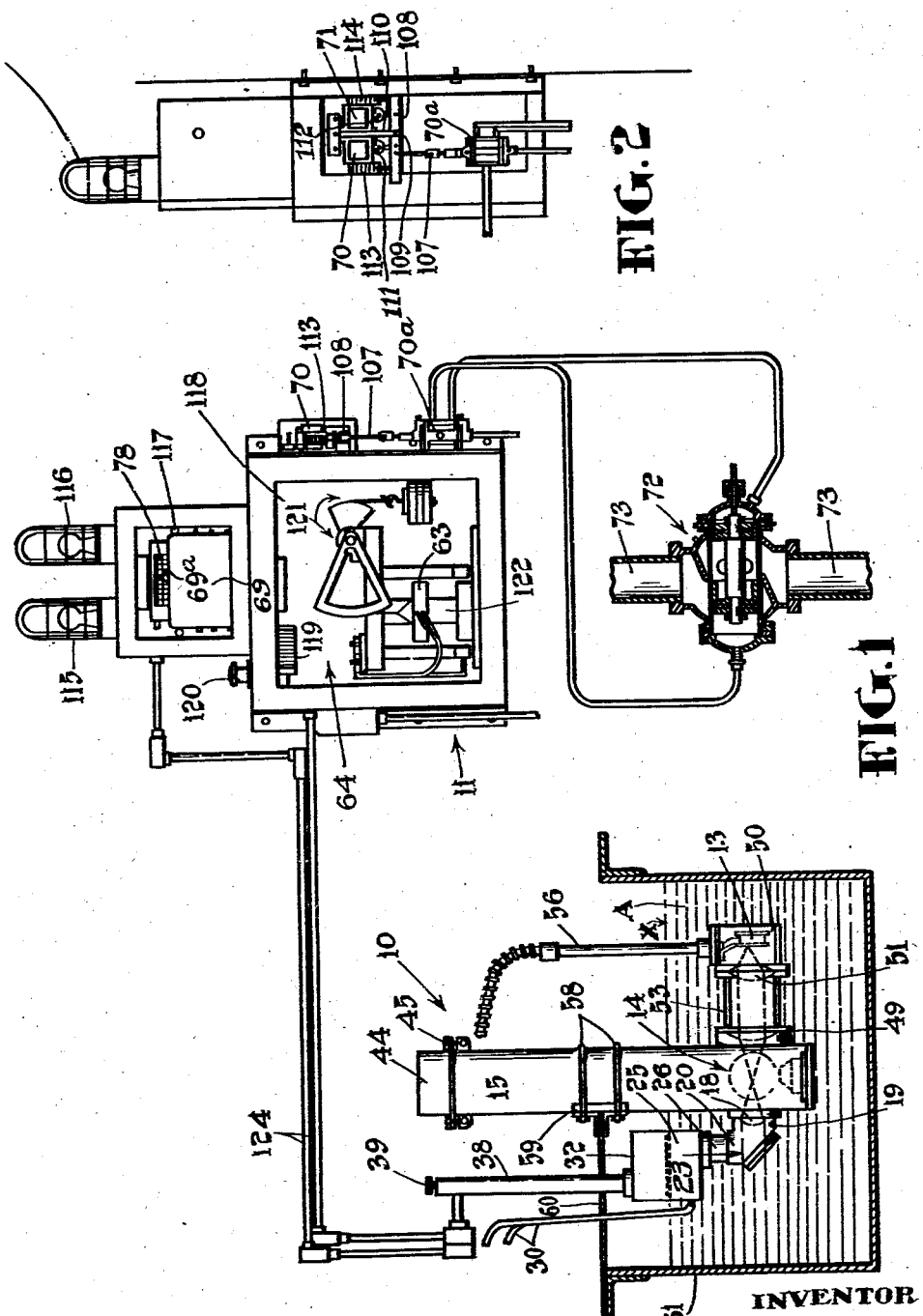
INVENTOR
D.L.WEST
BY *Featherstonhaugh & Co.*
ATTORNEYS Feb. 5, 1946.  D. L. WEST  2,394,129
PHOTOELECTRIC CONSISTENCY INDICATING METHOD
Filed June 23, 1941  3 Sheets-Sheet 2

INVENTOR
D. L. WEST
BY Fetherstonhaugh &Co.
ATTORNEYS

Feb. 5, 1946.　　　　D. L. WEST　　　　2,394,129
PHOTOELECTRIC CONSISTENCY INDICATING METHOD
Filed June 23, 1941　　　3 Sheets-Sheet 3

INVENTOR
D.L.WEST
BY Fetherstonhaugh & Co.
ATTORNEYS

Patented Feb. 5, 1946

2,394,129

UNITED STATES PATENT OFFICE 2,394,129

PHOTOELECTRIC CONSISTENCY INDICATING METHOD

Douglas L. West, Montreal, Quebec, Canada, assignor to Howard Smith Paper Mills Limited, Montreal, Quebec, Canada Application June 23, 1941, Serial No. 399,364
In Canada June 6, 1941

2 Claims. (Cl. 88—14)

This invention relates to improvements in methods adapted to be used for the purpose of indicating the consistency, turbidity, or other characteristics or properties of fluent materials such as aqueous suspensions of solids, solutions and the like.

An important object of this invention is to provide an improved method in which photoelectric cells are used in combination with a source of light and suitable indicating means for indicating undesirable variations in the consistency of an aqueous suspension of solids such, for example, as a suspension of pulp fibres in water.

An important feature of the invention, as regards its use for indicating changes in the consistency or turbidity of suspensions or solutions resides in the provision of a generally improved method whereby those variations in the light transmitting characteristics of the suspension or solution which have no relation to turbidity or consistency, but are due solely to changes in the colour of the liquid component of the suspension or solution, are eliminated as an error introducing factor.

The foregoing and other objects, features and characteristic advantages of the invention will be more readily understood from the following detailed description taken in connection with the accompanying drawings, in which—

Figure 1 is a view partly in front elevation and partly in vertical section of one form of instrument for use in performing the method of my invention.

Figure 2 is a side elevation of part of a control unit appearing in Fig. 1.

Figure 3:
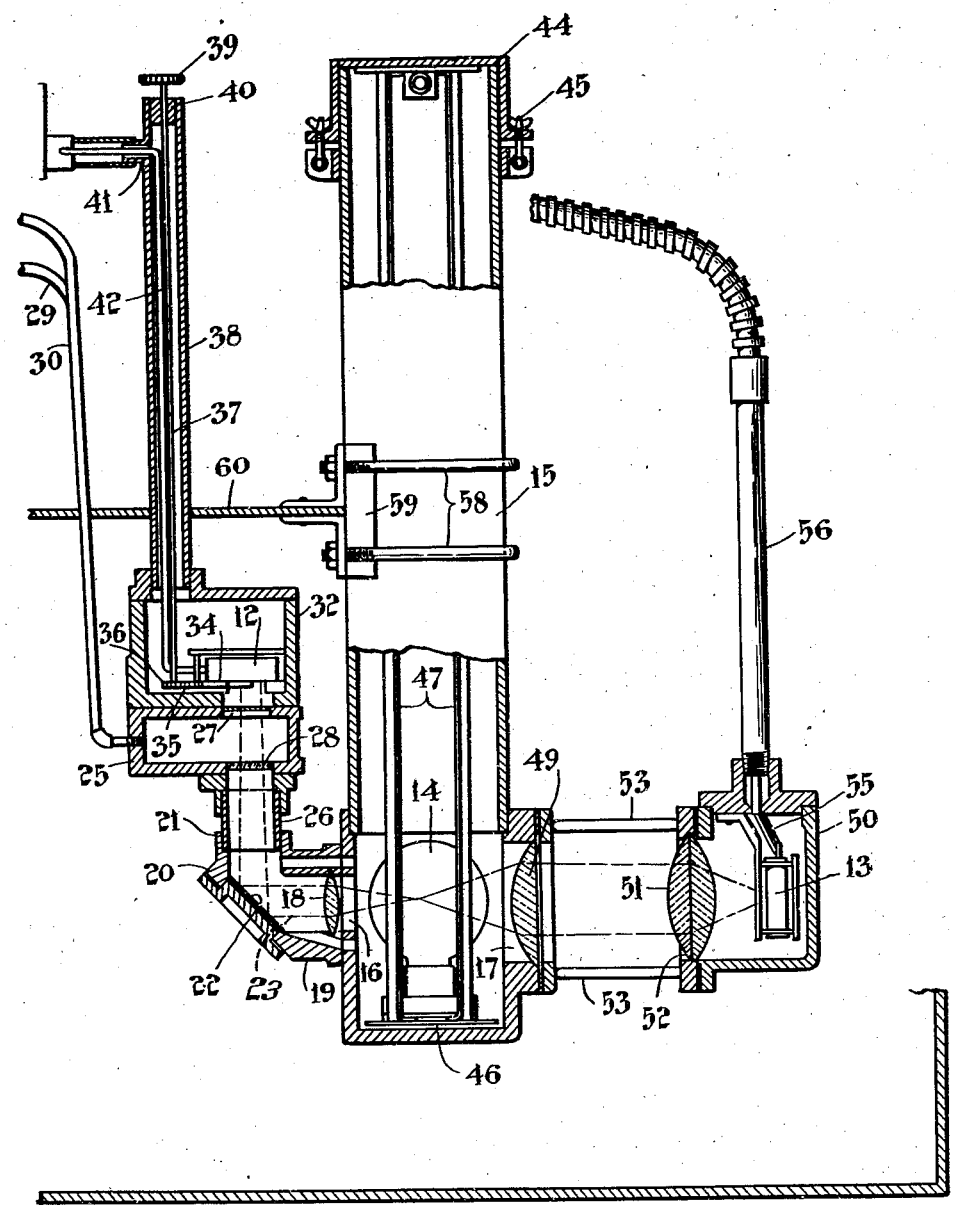
Figure 3 is an enlarged view, mainly in section, of an immersion or detecting unit forming part of the instrument appearing in Fig. 1.

The instrument shown in Figs. 1 to 6 inclusive is especially adapted for indicating and controlling the consistency of an aqueous suspension such, for example, as a suspension of wood pulp fibres in water. It comprises an immersion or detecting unit 10 and a combined indicating and control unit 11. The unit 10 is immersed in the aqueous suspension as hereinafter described and serves to effect a predetermined operation of the indicating and controlling unit 11 in response to those changes in the light transmitting characteristics of the suspension which are due to changes in consistency.

Unit 10 (see Figs. 1 and 3) comprises two cuprous oxide photo-electric cells 12 and 13 arranged so that their light sensitive surfaces are exposed to light produced by a 250 watt Mazda flood lamp 14. This lamp is housed in the lower portion of a tubular lamp housing 15 and is positioned between oppositely located window openings 16 and 17. A biconvex lens 18 is held in place over the window opening 16 by the horizontal arm 19 of an elbow 20 which is attached to the lamp housing so that its other arm 21 is directed upwardly. A reflecting mirror 22 is arranged in the elbow at an angle of 45° to the central axes of the elbow arms 19 and 21. Part of the light produced by the lamp 14 passes through the lens 18 and elbow arm 19 as a collimated beam 23 which falls on the mirror 22 and is deviated 90° toward the bore of the upwardly directed elbow arm 21. A casing 25 is mounted on the elbow 20 by a short length of tubing 26 having its upper end fastened to said casing and its lower end fastened to the upper extremity of the upwardly directed elbow arm 21. The top and bottom walls of casing 25 are provided with glazed window openings 27 and 28 which are aligned with each other and with the bore of the elbow arm 21. Casing 25 is also provided, for a purpose hereinafter set forth, with fluid inlet and outlet connections represented by the pipes 29 and 30.

A cell housing 32 is mounted on casing 25 and contains the light sensitive cell 12 whose light sensitive portion is exposed to the light which is reflected through the window openings 27 and 28 by the mirror 22. A light controlling shutter 34 is slidably mounted between the window opening 27 and the light sensitive portion of cell 12 and is adjustable to control the amount of light falling on said cell. As here shown the shutter 34 is provided with a rack 35 which is driven by a pinion 36 fixed to the lower end of an operating shaft 37. Shaft 37 extends upwardly within a tubular extension 38 of housing 32 and is equipped at its upper end with a hand wheel 39. The extension 38 is closed at its upper end, as indicated at 40 and is provided with a lateral opening 41 through which the conductors 42 are passed to the cell 12.

The lamp housing 15 is permanently closed at its lower end and is provided at its upper end with a removable cap 44 which is secured in place by a conventional arrangement of clamping bolts 45. The base of the lamp 14 is mounted on a platform 46 which is suspended from the cap 44 by a plurality of suspension bars 47. This arrangement permits the lamp to be easily and conveniently inserted in the lamp housing or removed therefrom.

The window opening 17 of the lamp housing is fitted with a large lens 49.

The cell 13 is arranged in a housing 50 with its light sensitive surface facing a lens 51 fitted in the window opening 52. The housing 50 is supported from the lamp housing 15 by a plurality of spaced supporting rods 53 so that the opposing lenses 49 and 51 are separated by a substantial space which, during use of the instrument, is occupied by a portion of the aqueous suspension A in which the unit 10 is submerged. The conductors 55, connected to cell 13, are passed into housing 50 through a suitable conduit 56.

As shown in Figure 1 the lamp housing 15 is clamped, by U-shaped clamping bolts 58, to a saddle plate 59 rivetted to the inner end of a bracket 60 extending inwardly from one of the side walls of the flow channel 61 which, in the present instance, may be taken as representing a flow channel through which an aqueous suspension of wood pulp fibres indicated at A is being conducted to the flow box of a pulp or paper making machine. The lamp housing 15 is clamped to the bracket 60 in such manner that the photo electric cells 12 and 13 and the lamp 14 are disposed below the liquid level X.

A portion of the aqueous suspension A with which the flow channel 61 is supplied is filtered to separate the liquid from the solid component and the liquid component of the separation is continuously circulated through the casing 25 by means of the previously mentioned inlet and outlet pipes 30.

From the foregoing description it will be apparent that the amount of light received by the cell 12 is dependent on the light transmitting properties of the filtrate and the position of the light controlling shutter 34 while the amount of light received by the cell 13 is dependent on the density or consistency of the aqueous suspension flowing in the space between the lenses 49 and 51.

It is important that the current supplied to the lamp 14 be maintained at a constant value. In the present instance the lamp is shown connected across the secondary winding 63 of a 250 watt constant current regulating transformer 64 (see Fig. 4) whose primary winding 65 is connected across a 110 volt supply represented by the line wires 66 and 67.

The combined indicating and control unit 11 comprises a contacting D. C. micro-amp central zero galvanometer 69 and a pair of pilot actuating coils 70 and 71 controlling the operation of a pilot valve 70a which, in turn, controls the operation of a main hydraulic piston valve 72 which serves to open or close a water supply line 73 through which water is supplied to the aqueous suspension A to regulate the consistency thereof.

Figures 4, 5, 6:
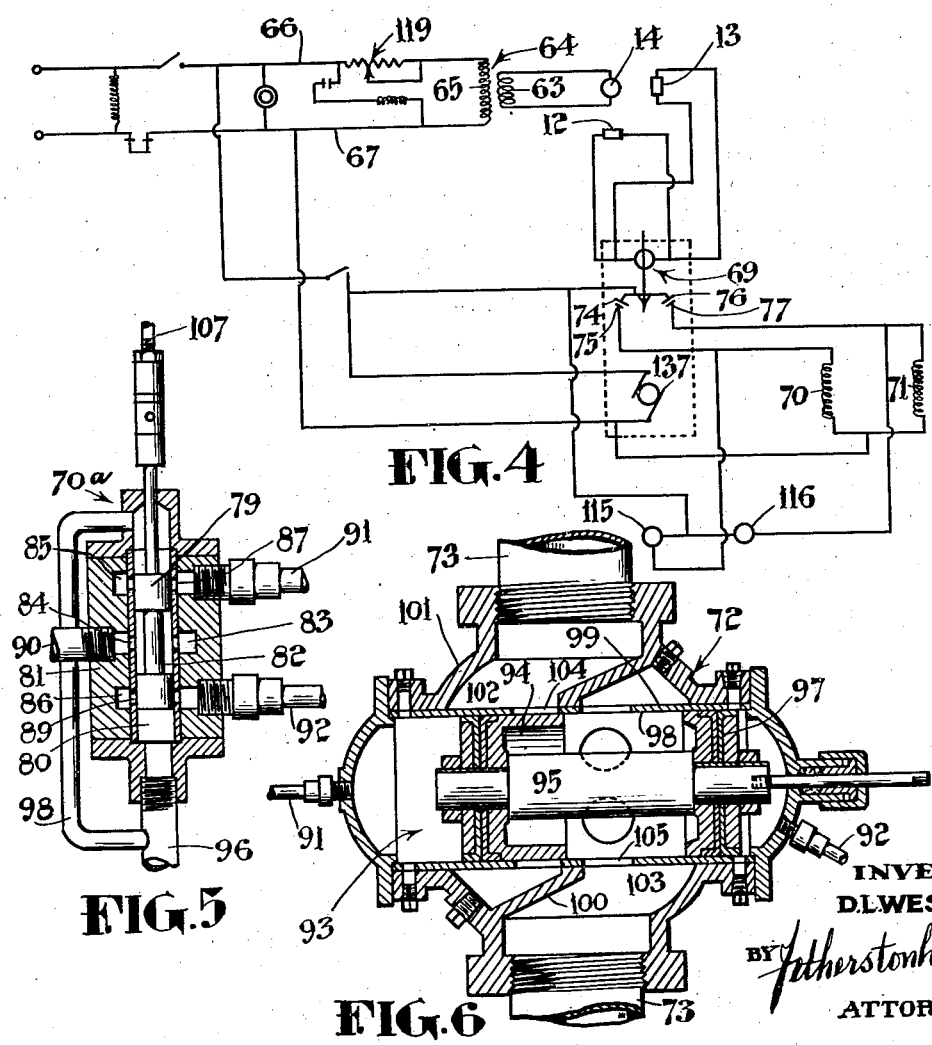
Figure 4 is a wiring diagram of the electrical device and connections embodied in the instrument shown in Figure 1.
Figure 5 is a sectional view of a pilot valve forming part of said instrument.
Figure 6 is a sectional view of a main valve forming part of said instrument.

As shown in Figure 4 the photo-electric cells 12 and 13 are connected to the terminals of the galvanometer 69 and tend to cause the galvanometer needle 69a to be deflected in one direction or the other whenever there is uneven distribution of light between the cells. Deflection of the galvanometer needle in one direction serves to close the control contacts 74 and 75 to thereby connect the pilot valve actuating coil 70 across the line wires 66 and 67 whereas an opposite deflection of the needle from a central zero point serves to close the galvanometer contacts 76 and 77 and thereby connect the pilot valve actuating coil 71 across the line wires 66 and 67. The deflection of the galvanometer needle in either direction also indicates on the calibrated galvanometer scale 78 (Fig. 1) the change in consistency resulting in such deflection.

The pilot valve 70a is shown in section in Fig. 5. It comprises a valve 79 working in a liner 80 provided in a valve casing 81. Valve 79 is provided with an annular port 82 which is always in communication with the valve casing port 83 through suitable openings 84 provided intermediate the length of the liner 80. Casing port 83 is located between an upper casing port 85 and a lower casing port 86. The upper casing port 85 is in communication with the upper openings 87 of the liner 80 while the lower casing port 86 is in communication with the lower openings 89 of the liner 80. The casing port 83 is connected to a pressure fluid supply line 90 while the casing ports 85 and 86 are respectively connected, by pipe lines 91 and 92, to opposite ends of the cylinder 93 of the main valve 72. When the pilot valve 79 is in the neutral position shown in Fig. 5, the valve casing ports 85 and 86 are isolated from the valve casing port 83.

When the pilot valve 79 is raised to its uppermost position, the port 82 thereof connects the casing ports 83 and 85 so that pressure fluid is supplied, through pipe line 91, to the left hand end of the main valve cylinder 93 and acts against the piston 94 of the main valve 95 to move the valve to the right. At this time fluid previously supplied to the main valve cylinder 93 through pipe line 92 is discharged through said pipe line to the casing port 86 of the pilot valve and passes from thence to the discharge pipe 96. When the pilot valve 79 is moved to its lowermost position the casing port 83 is connected to the casing port 86 so that pressure fluid now flows through pipe 92 to the right hand end of the main valve cylinder 93 and acts against the piston 97 to move the main valve 95 to the left, the pressure fluid previously supplied to the left hand end of the main valve cylinder 93 being now exhausted through pipe line 91, pilot valve casing port 85 and by-pass 98 to the exhaust line 96.

The movable valve member 95 of the main control valve 72 works in a sleeve 99 which forms the cylindrical wall of the cylinder 93. The cylinder 93 extends through a partition 100 which divides the main valve casing 101 into separate chambers as indicated at 102 and 103. The sleeve 99 is provided, at one side of the partition 100, with openings 104 communicating with chamber 102. Sleeve 99 is also provided, at the opposite side of partition 100, with openings 105 communicating with chamber 103. When the movable valve member 95 is in the right hand or valve closing position shown in Fig. 6, the piston 94 blocks the openings 104 and disrupts communication between the chambers 102 and 103 thus preventing flow of fluid through the water supply line 73. When the pilot valve is in a position such that pressure fluid is supplied to the right hand side of cylinder 93 and exhausted from the left hand side of said cylinder, the piston 97 is forced to the left so that the piston 94 uncovers the openings 104 and permits flow of water from the main valve chamber 102 to the main valve chamber 103.

The movable valve member 79 of pilot valve 70a is connected by a rod 107 to a locking lever 108 which is intermediately pivoted at 109 to a suitable supporting bracket 110. The armatures 111 and 112 of the solenoid coils 70 and 71 are pivotally connected to the lever 108 at opposite sides of the pivot 109 so that energization of the coil 70 serves to raise the pilot valve 79 to its uppermost position while energization of the coil 71 serves to lower the pilot valve to its lowermost position. The intermediately pivoted lever 108 is normally held in a horizontal position by means of suitable spring devices 113 and 114 exerting downward pressure at opposite ends of the lever.

A pilot lamp 115 is connected in the circuit shown in Fig. 4 so that this lamp lights up whenever the pilot valve actuating coil 70 is energized. A second pilot lamp 116 is also connected in said circuit to light up whenever the pilot valve actuating coil 71 is energized.

In Fig. 1 the pilot lamps 115 and 116 are shown mounted on a cabinet comprising a top compartment 117 containing the galvanometer 69 and a bottom compartment 118 which contains the transformer 64 and also supports the pilot valve actuating coils 70 and 71 and the pilot valve assembly 70a. The transformer 64 is equipped with a series starting rheostat 119 (Figs. 1 and 4) which is adjusted by means of the operating knob 120.

The current transformer 64 may be of any suitable type but in the present instance I have shown a conventional constant current regulating transformer of the type in which the secondary coil 63 is suspended by a flexible counterbalancing weight system 121 so that it is free to move on the transformer coil 122 to maintain the current output of the transformer at a constant value. It is not considered necessary to enter into a detailed discussion of this type of transformer since its operating characteristics are well understood in the art. It is sufficient to state that the function of this transformer is to maintain constant current input to the lamp 14 against changes in the filament resistance of the lamp or variations of the line voltage applied to the primary coil 65 of the transformer. The object of such regulation is to preserve a constant brilliancy of light output from the lamp.

The purpose in circulating the filtrate through the casing 25, as previously explained, is to ensure that both cells 12 and 13 will be equally affected by those changes in the light transmission characteristics of the aqueous suspension which are due solely to changes in the colour of the liquid components of the suspension and have no relation to the density or consistency characteristics.

When the instrument described herein is in use a portion of the light from lamp 14 passes through the lens 49, the aqueous suspension A and the lens 51 and falls upon the photoelectric cell 13. Another portion of the light from the lamp is focused through the lens 18 and falls upon the mirror 22 by which it is reflected through the glazed window opening 26, the liquid in casing 25 and the glazed window opening 27 to fall upon the light sensitive surface of the cell 12. It is obvious that if both photoelectric cells receive the same amount of light thereon, their voltages at the terminals of the galvanometer will balance each other with the result that the galvanometer needle will remain at rest at the centre zero point of the scale 78. As the amount of light received by the cell 13 is a variable quantity, dependent on the density of the stock solution flowing between the lenses 49 and 51 the galvanometer can be brought to balance for any density by adjusting the shutter 34 so that the amount of light falling on the cell 12 will be equal to the amount of light falling on the cell 13.

Assuming that the shutter 34 is adjusted to maintain equal disposition of light between the photoelectric cells 12 and 13 for a given density or consistency of the aqueous suspension A, it is obvious that any variation in the density or consistency of the suspension will result in a corresponding variation of the amount of light falling on the cell 13 and will result in either a minus or plus deflection of the galvanometer needle depending on whether the variation in the amount of light falling on cell 13 is due to an increase or decrease of density or consistency. When the galvanometer needle is deflected in response to a change in the consistency of the aqueous suspension it acts, as previously explained, to energize one or the other of the solenoid coils 70 and 71 to effect an appropriate operation of the main hydraulic valve 72 whereby the amount of water supplied to the suspension is increased or decreased as required.

The instrument described herein has been found particularly useful for indicating and controlling the consistency of dilute pulp stock suspensions whose desired consistency ranges from 0.25 to 8 or 9%. In this application of the invention the time response of the entire system is a factor of considerable importance. Wood fibres, even in a very dilute aqueous suspension, do not disperse evenly throughout a unit volume of the mixture.

Assuming all things to be constant, it may be stated that if such a suspension is traversed by light while it is in a flowing condition the light undergoes instantaneous changes of absorption corresponding to the variations of dispersion of the wood fibres. As a result of this phenomenon the galvanometer needle varies between a plus and minus reading. It is therefore essential that the control afforded by the instrument described herein shall be based on an average condition of response and for this purpose the following conditions are necessary.

The light must be transmitted through as large a cross section of the suspension as is possible and this may be provided for by making the openings 17 and 52 and the lenses 49 and 51 as large as possible.

The system of the lens 18, mirror 22, fluid chamber 25, photoelectric cell 12 and shutter 34 is provided for obtaining galvanometer balance at zero for some definite concentration of the aqueous suspension under test. On the other hand, since the two photoelectric cells 12 and 13 are connected in opposition at the galvanometer, it will be apparent that any small variation of lamp brilliancy, which may be due to variations of the current supplied to the transformer and not being completely smoothed out will, upon reaching the photo cells as light fluctuations, be cancelled out at the galvanometer as opposing voltages.

As regards the attainable sensitivity of control of the instrument, for a given galvanometer sensitivity, this is dependent on the optimum value of light which passes through the aqueous suspension from the lamp 14. The greater this value, the greater will be the degree of galvanometer deflection as related to unit change of concentration of suspended solid matter.

As shown in Fig. 1, the electrical connections to the cell 12 and the lamp 14 are encased in suitable conduits indicated at 124.

In Fig. 4 I have indicated how the valve operating motor 137 may be included in the electrical circuit so that its operation is controlled by the galvanometer 69.

Having thus described what I now consider to be the preferred embodiments of my invention, it will be understood that various modifications may be resorted to within the scope and spirit of the invention as defined by the appended claims.

Having thus described my invention, what I claim is:

1. A method of indicating variations in the consistency or turbidity characteristics of fluid material such as a solution or aqueous suspension which comprises connecting two photoelectric cells to operate an indicator in accordance with variations in the distribution of light between said cells, immersing both cells in the fluid material under test to ensure that said cells will be equally affected by changes in the temperature of said material, directing a beam of light from a light source so that said beam traverses said fluid material and then falls upon the light sensitive surface of one of said cells, directing a second beam of light from the same light source so that said second beam of light falls upon the light sensitive surface of the remaining cell without being passed through said fluid material and modifying the color characteristics of the light falling upon the last mentioned cell to compensate for those color changes which affect the light transmitting properties of the fluid material but are not related to the turbidity or consistency characteristics of said material.

2. The method recited in claim 1, in which the last mentioned step is accomplished by filtering a portion of the fluid material and passing the filtrate across the path of light from said light source to the last mentioned cell.

DOUGLAS L. WEST.